United States Patent [19]

Tschirky et al.

[11] 4,098,561
[45] Jul. 4, 1978

[54] SEALED BEARINGS

[75] Inventors: John E. Tschirky, Long Beach; Gary Monroe Crase, Cypress, both of Calif.

[73] Assignee: Smith International, Inc., Newport Beach, Calif.

[21] Appl. No.: 556,622

[22] Filed: Mar. 10, 1975

[51] Int. Cl.² .......................... F01C 1/10; F01C 5/04; F01C 19/00
[52] U.S. Cl. ...................................... 418/48; 418/104; 277/59
[58] Field of Search .................... 418/48, 104; 277/59, 277/64, 112; 175/107

[56] References Cited

U.S. PATENT DOCUMENTS

| 2,990,894 | 7/1961 | Mitchell et al. | 175/107 |
|---|---|---|---|
| 3,145,787 | 8/1964 | Brown | 175/107 |
| 3,684,301 | 8/1972 | Malaval | 277/59 |
| 3,807,513 | 4/1974 | Kern et al. | 277/59 X |
| 3,857,655 | 12/1974 | Tschirky | 418/48 |
| 3,930,765 | 1/1976 | Waite | 418/48 |

Primary Examiner—Carlton R. Croyle
Assistant Examiner—Leonard Smith
Attorney, Agent, or Firm—Subkow and Kriegel

[57] ABSTRACT

This invention relates to sleeves for sealed bearings for rotating shafts employing packing glands mounted in the floating sleeve whereby the integrity of the seal is maintained during transverse displacement of the shaft.

7 Claims, 5 Drawing Figures

SEALED BEARINGS

This invention relates to seals for bearing-supported rotary shafts and provides seal mountings so as to maintain seal integrity irrespective of whipping action of the shaft. The design of the seal mounting is such that the integrity of the seal is not affected by any transverse deflection of the shaft which could reduce the seal pressure on any surface of the rotating member so as to impair the seal at that surface.

The seal system of our invention mounts the seal on a sleeve in the shaft housing so as to create a seal between that end and the shaft and the housing. The sleeve is spaced from and is flexibly supported by the housing and is here referred to as a floating sleeve. A seal is mounted between the sleeve and the adjacent surface of the shaft or a wear sleeve mounted on the shaft.

Since the floating sleeve carrying the seal is mounted so that the shaft can deflect either under load or due to bearing clearances or wear without any substantial angular deflection of the shaft, the integrity of the seal at the surface of the wear sleeve, if used, is unaffected.

Space between the floating sleeve and the housing on which it is mounted may be sealed so as to inhibit the exiting of fluid from the annular space between the shaft and the housing. The space may be enclosed at one end of the sleeve in a flexible connection for this purpose. This is particularly important where the environment, in which the sleeve is to operate, contains solids suspended in a fluid which could deposit in the space between the sleeve and the member on which it is mounted. The sleeve may be used in connection with bearings employed in pumps which pump mud, cement, or other slurries. In the case of fluid motors where the fluid used to operate fluid turbines or progressive cavity motors as described herein, our invention will ensure that the solids will not get between the sleeve and its support and yet will be free to be displaced with respect to the rotating member mounted in the bearings.

These and other objects of our invention will be understood by reference to the drawings, of which FIG. 1 is a somewhat schematic showing of one application of our invention;

The following description of our invention is directed to our presently preferred embodiment and application of our invention. It will be understood that the floating sleeve and seal may be applied to any rotating element where it is desired to introduce a barrier to a fluid under pressure on one side of the seal.

Figure 1:
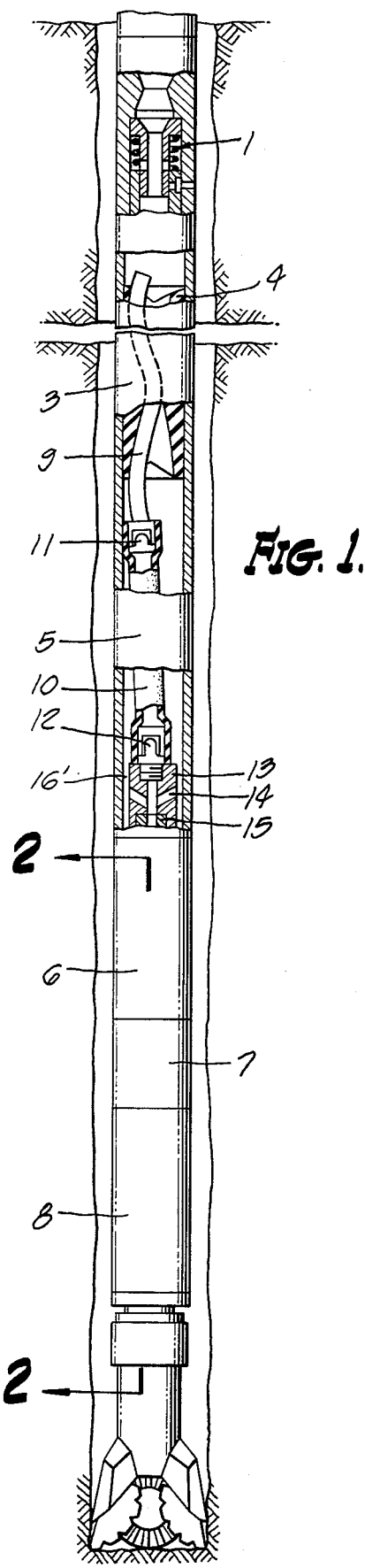

The motor shown in FIG. 1 is a progressing cavity motor. The motor housing 3 (see FIG. 1) is connected to the by-pass assembly 1. The motor housing 3 carries a stator 4 bonded to the interior surface of the housing 3. The connecting rod assembly housing 5 is connected to the housing 3 and to the bearing housing 7 and 8. The drive shaft assembly housings 6, 7, and 8 carry the seals and bearing assemblies. The housing 6 is connected by a pin and box connection to the housing 5 and to the housing 7. The housing 7 is connected to the lower drive shaft bearing assembly housing 8, all to be more fully described below.

The rotor 9, mounted inside the stator 4, at its lower end is connected to the connecting rod 10 by a universal joint 11 and to the tubular drive shaft 15 through the drive shaft cap 13 connected to the connecting rod by a like universal joint 12.

The universal joint may be one such as described in the Neilson et al U.S. Pat. Nos. 3,260,318, patented July 12, 1966, or in the Neilson et al 3,260,069, patented July 11, 1966.

The connecting rod and universal joints may be enclosed in a flexible cover to protect them from erosion by the mud and to contain the lubricant inside the connecting rod assembly.

The progressing cavity motor shown is of the helicoidal type. The outer body of the motor, that is, the stator, is composed of an elastomer, for example, a rubberlike compound, which creates a spiral cavity throughout its length to provide a double spiral groove. The passage of fluid through the stator 4 and past the rotor along its length causes a rotation of the rotor and a movement of the rotor from side to side creating an eccentric rotation at the end of the rotor where it is connected to the connecting rod. Because of the universal joints, the eccentric motion is converted into a true rotary motion (concentric) at the drive shaft 15. The fluid as it exits the stator passes through the connecting rod housing 5, around the connecting rod and drive shaft cap 13 through bypass annulus 16'. The drive shaft is provided with orifices 14. At this point, the mud is under very high pressure and passes in considerable volume and pressure from the exit of the stator.

For example, and not as a limitation of our invention, the required pressure at the exit of the stator may be, depending on the depth of the bore hole, in the order of 500 to 1500 pounds per square inch. This is the differential pressure at the bit nozzle. Such pressures are required in order to have the required velocity and fluid volume rate through the bit nozzles in order that there will be the necessary pressure and volume of fluid at the bottom of the hole for better hydraulic and bit cutting action, and to return the cuttings to the surface.

In order to protect the bearings, we provide a barrier seal between the bearings and the stator outlet. In order to protect the shaft, we provide a wear sleeve.

A radial bearing is provided between the stator outlet and the seal and bearing assemblies. We may use any type of radial bearing but prefer to employ the metallic radial bearing flow restrictor assembly disclosed in our copending application Ser. No. 388,586 filed Aug. 13, 1973, and Ser. No. 544,143 filed Jan. 27, 1975, which are hereby incorporated in this application by this reference or rubber bearings as shown in the Garrison U.S. Pat. No. 3,456,476.

Such radial assemblies are composed of a sleeve 16 mounted on the housing 5. The complementary bearing member consists of a sleeve 17 mounted on the shaft 15. One or the other of the sleeves may contain circumferentially spaced grooves along its length.

If the radial bearings carry passageways, which passageways communicate with the annulus 45, the space 45 may be vented to the exterior of the housing at vent 19. Where this is not desirable, the vent may be omitted.

The relative motion between the shaft 15 and the floating sleeve 33 places no inordinate transverse pressure against the packing gland 32. Such relative motion may occur due to transverse loading on the shaft as a result of the whipping action due to vibratory forces during drilling. Also, machinery and assembly tolerances or wear at the bearings will cause the shaft to whip where transverse loading on the shaft results from such loads at the drill.

Figure 2:
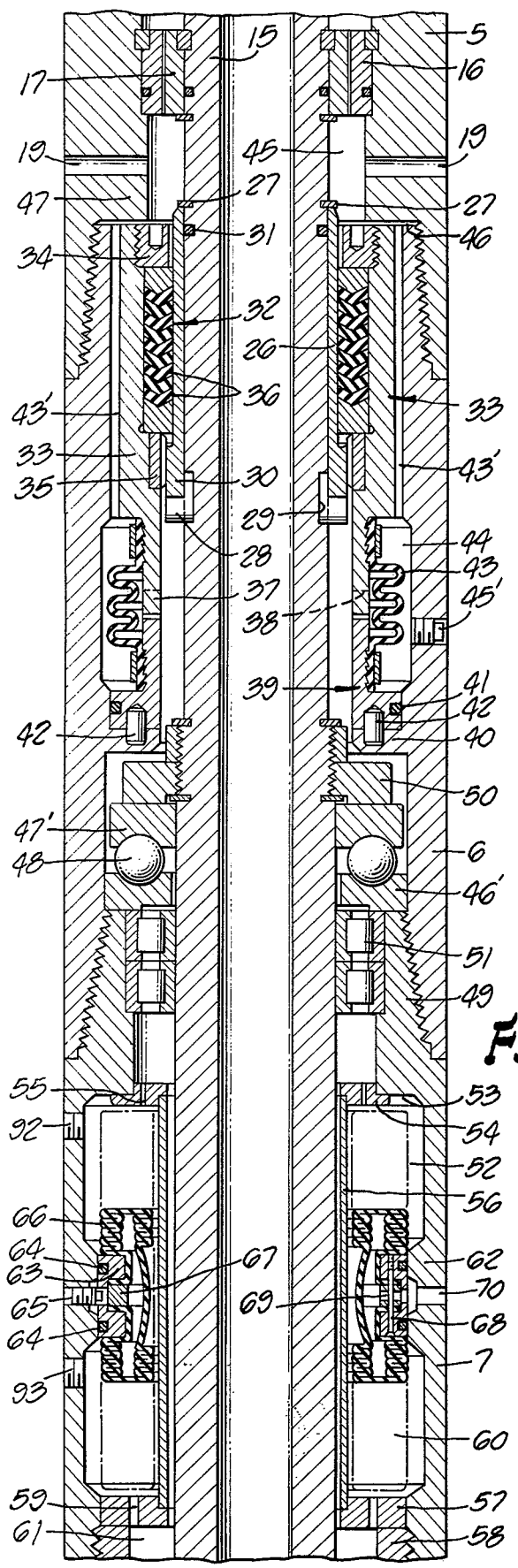
FIG. 2 is an upper fragmentary section of the assembly taken on line 2—2 of FIG. 1.

Referring to the form shown in FIG. 2, the wear sleeve 26 is mounted on the hollow shaft 15 between the snap ring 27 and the keys 28 in the key notches 29 in the shaft 15. The sleeve 26 is end notched at 30 at diametric positions to fit over the keys 28. It is sealed from the shaft 15 by the "O" ring 31.

The packing gland 32 is mounted on the floating sleeve 33 between the end nut 34 and the spacer ring 35. The packing gland 32 is composed of chevron packing rings 36 of internal diameter to be in sealing relation with the surface of the wear sleeve 26.

The floating sleeve 33 ends in a pair of circumferentially spaced dogs 37 which fit into end slots 38 in ring 39. Ring 39 is seated on internal flange 40 of housing 6 and sealed from the housing by the "O" ring 41 and secured by pins 42. The floating sleeve 33 is connected to the ring 39 by the flexible boot 43 by suitable clamps. The boot forms a cylindrical flexible seal between the ring 39 and the sleeve 33 and forms a barrier between the annular spaces 43' and 44 and the annulus 45 at the discharge end of the flow restrictor-radial bearing 16. The flexible boot may be made of any flexible material, such as rubber, and corrugated to permit and transverse deflection of the boot so as to permit the displacement of the floating sleeve 33. The vertical displacement of the sleeve 33 is limited by the space 46 between the end of the sleeve 33 and the internal shoulder of the box 47. The transverse deflection of the shaft 15 is permitted by the annulus 43' which is of a radial dimension greater than any expected deflection of the shaft 15.

The deflection of the shaft radially will cause the shaft, wear sleeve 26, gland 32, and floating sleeve 33 to move radially. The sleeve 33 is free at the end at 46 and the dogs 37 fit loosely in the end notches 38, with the boot 43 being flexible. Since the annular space 43' is of ample dimension, the deflection of the shaft does not impair the sealing integrity between the gland 32 and the floating sleeve 33. The space 43' and annulus 44 may be partially filled with a soft lubricating grease through the fill ports 45' sealed by a plug. The pressure at the ports 19 being at the pressure existing at the exterior of the housing, the movement of mud into the lubricating annulus 43' is minimized.

The upper thrust bearing assembly is composed of the races 46' and 47' and balls 48. The upper bearing in the position shown in the drawings (FIG. 2) carried the weight of the rotor and connecting rod, shaft and bit, and transmits it to the pin 49 of the housing 7, the load of the housings being off the bit as is more fully described below. The load is applied to the upper bearing by the nuts 50, screwed and secured to the shaft 15.

A radial bearing 51 is provided adjacent the upper thrust bearing.

The lubricator housing 7 is connected via pin 49 to the box end of the housing 6 providing an annular space 52 beneath the upper thrust bearing which communicates between the radial bearings 51 and the free space about the upper bearing assembly. The free space above the bearing assembly includes the clearance between the shaft 15 and the ring 39 and the floating sleeve 33 beneath the gland 32.

Below the pin 49, the housing 7 has an enlarged internal diameter providing a space 52 underneath the internal shoulder 53 against which is seated a plate 54 carrying bores 55. A sleeve 56 is welded to plate 54. A lower plate 57 is positioned on the top of the pin 58 of the lower bearing housing 8 (See FIG. 2) and carries bores 59. The sleeve 56 is connected to plate 57. The sleeve 56 is spaced from the drive shaft 15 forming an enclosure 60 between the sleeve 56 and the housing which communicates through the bores 59 with the annulus 61 between the pin 58 and the drive shaft 15 and the upper bearing assemblies. Communication is also provided from the space 61 around the lower bearing as described below.

Positioned in the internal wall of the housing 7, intermediate between the plates 54 and 57 is a circular boss 62. The bellows ring 63 sealed against the internal wall of the boss 62 by the "O" rings 64 is held in position by a series of spaced set screws 65 circumferentially positioned about the housing 7 and flush with the outer surface thereof.

The bellows 66 is held in the ring 63 by the wedge ring 67 and secured by a plurality of circumferential spaced screws 68. The ring is bored at 69 to provide a communication with bore 70 positioned in the housing 7 and in registry with the bore 69. The bellows assembly 66 including the ring 63 is a commercial item available on the general market and needs no further description. The bellows is modified by provision of the bore hole 69 and the seats for the screws 65. Any bellows or bag or any other expandable container that will function in a similar manner will be suitable for the purposes of our invention. However, a bellows employed in the herein combination, which communicates with the exterior of the housing, has a particular useful function in the combination with the bearings assembly and seal assembly described above.

The housing 8 below the pin 58 is of enlarged diameter ending in a beveled shoulder 71 against which is positioned the load plate 72. The races 73, 74 and balls 75 form a bearing assembly. The Belleville spring 76' positioned between the load plate 72 and race 73 spring loads the bearing. This assembly is supported on the retaining ring 76 positioned on the drive shaft 15.

The spacer sleeve 77 sealed by an "O" ring 78 is positioned on the drive shaft 15 and abuts underneath the retaining ring 76. The radial bearing housing 79 carries radial bearing sleeve 80. The complementary bearing sleeve 81 seats against the spacer sleeve 77. The two concentric and contiguous cylinders 80 and 81 formed of hard materials, such as tungsten carbide or other material similar to the radial bearings 16 and 17, are positioned to form radial bearings 80 and 81. The outer cylinder 80 is sealed against the inner surface of 79 by "O" rings. The seal cups 82 are held in position in 79. Radial bearings sleeve 80 is held in position in bearing housing 79, by retaining ring 83, and kept from rotation by pin 84, which enters the notch 85 in 80.

The complementary bearing sleeve 81 is mounted on the surface of the drive shaft 15 to be positioned underneath the spacer 77. The end of the sleeve 81 carries notches 86.

The tungsten carbide cylinders 80 and 81 are polished and form a sliding fit. The sleeve 81 is locked to the shaft and the sleeve 80 is locked to 79.

The drill bit box 87 is formed integrally with the drive shaft 15 at the end thereof. The box carries a fitting 88 which has dogs 89 diametrically arranged which are adapted to fit into the notches 86. The fitting 88 is located on the shoulder of the drill bit box by pins 90 positioned in the box 87 and by entry into the bores in 91.

Figure 3:
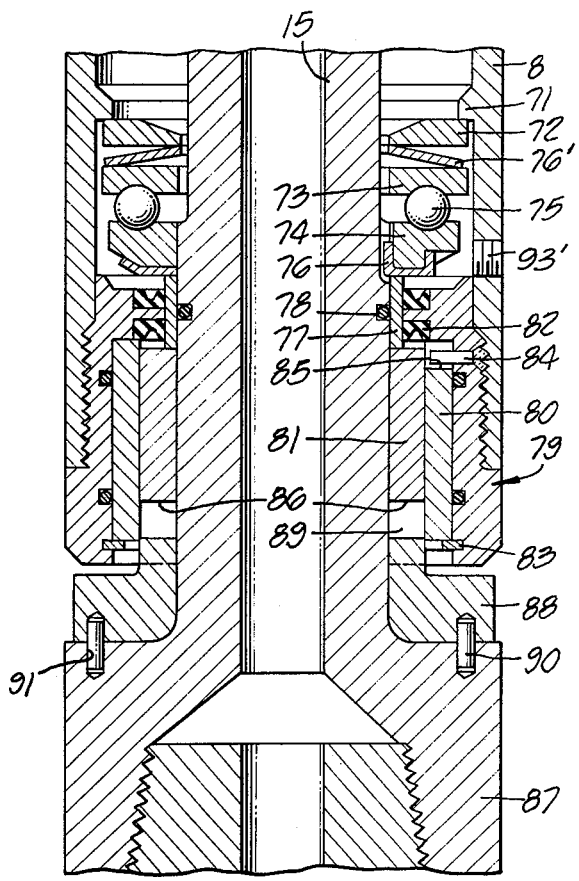
FIG. 3 is a lower fragmentary section taken on line 2—2 of FIG. 1.

The assembly as shown in FIGS. 2 and 3 shows the parts with a load on the upper bearing as if the weight of the drill string was off the bit and on the upper bearing as shown.

As will be noted, the housing 6 is bored with bores and sealed by plug 45' adjacent to the boot 43 and by fittings 92, 93, and 93'. The free spaces below the gland 32, and in 52, 60 and between 60 and the seals 82 may be filled with lubricant through ports 92, 93, and 93'.

Figure 5:
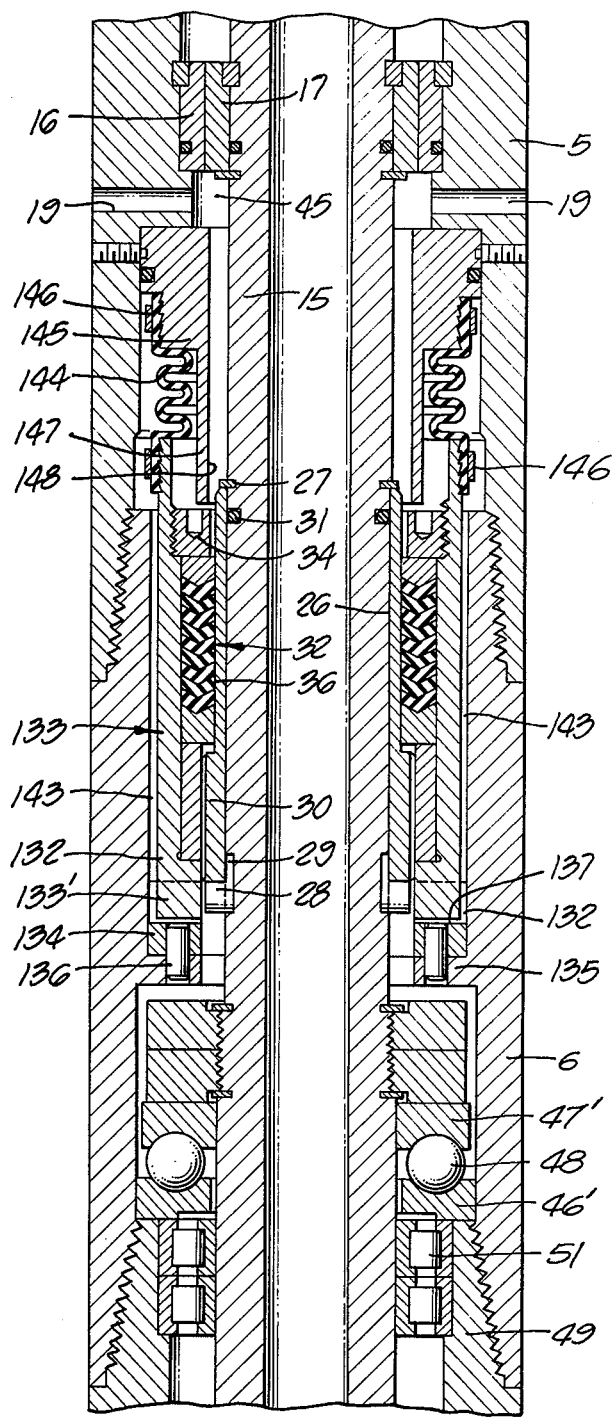
FIG. 5 is a modification of FIG. 2.
Figure 4:
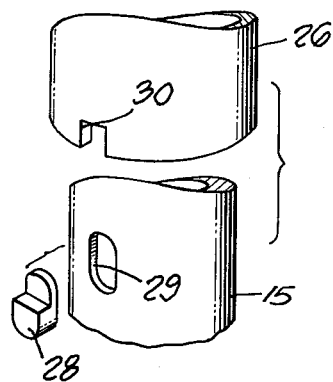
FIG. 4 is a sperspective view of a detail of FIGS. 2 and 3.

FIG. 5 shows a modification of the form shown in FIGS. 2-4, in which all parts which are the same as in FIGS. 2-4 bear the same numbers. Reference is made to the description of the structure and function of the parts with respect to FIGS. 2-4.

The difference is in the manner of sealing the space between the floating sleeve and housing from the fluid present in space 45 above the packing gland 32.

Only one boot 144, such as in FIG. 5, is provided at the upper end of the floating sleeve 133. It is clamped to the ring 145 and to the floating sleeve 133 by clamps 146. The ring 145 has a dependent sleeve 147, forming annulus 148 with the shaft 15 and extending between the boot 144 and the shaft 15. The lower end 132 carries the dogs 133' which enter the notched ring 134. The ring 134 is seated in the internal shoulder 135 and secured by the pins 136. Except as described above, the form in FIG. 5 is the same as in FIGS. 2-4. The parts on FIG. 5 bearing the numbers shown on FIGS. 2-4 relate to like parts.

It will be observed that the space 143 between the shaft and the floating sleeve 133 and the housing at the upper end of the space is sealed from the fluid in 45 above the gland 32 by the boot 144.

If the vent 19 is employed in either form (see FIGS. 2 and 5), the bore hole pressure at the vent 19 and at the bore 70 and at the end of the bearing housing 79 is substantially the same; and the mud pressure differential across the gland 32 is thus substantially zero. The packing gland 32 and the seal 82 are thus required to hold only a small pressure differential. Mud is thus kept out of the bearings.

When the bit is raised off bottom, the drill string and housings are raised by the drilling lines from which they are suspended and the rotor, connecting rod, drive shaft and drill bit move downward with respect of the housings as in FIG. 2.

The weight of the drill string and housings is off the lower thrust bearing assembly. However, the Belleville spring 76' is in sufficient compression to hold the races against the balls.

When weight is to be placed on the bit, the drill pipe, drill collars, and housing 5, 6, 7 and 8 are lowered with respect of the shaft and load is transferred from the upper thrust bearing assembly to the lower thrust bearings.

During the displacement of housings relative to the shaft in both directions, the wear sleeve 26 moves axially over the gland members 32. The relative axial length of the packing gland 32 and the sleeve 30 are such that the length of the sleeve 26 is greater than the axial extent of the packing gland. The packing gland remains in sealing relation to the wear sleeve during the relative axial displacement of the wear sleeve and packing gland.

The seal at the boots, together with the lubricant introduced as described in FIG. 2 prevents the entrance of mud which otherwise would pack between the floating sleeve 33 and the housing 6 so as to impair the relative displacement of the shaft and the floating sleeve. The relative displacement of the floating sleeve and housing does not change the total volume of the annulus and thus the pressure on the lubricant. The venting of the pressure at 19 aids in limiting the incursion of fluid at 46 in FIG. 2.

The transverse displacement of the shaft carries with it the packing gland and floating sleeve which is flexibly connected to the housing at one end by a flexible boot and free to be radially displaced at the other end. In the forms of FIGS. 2-4, the other end of the floating sleeve is free, i.e., disconnected from the housing. In the form of FIG. 5, the dogs 133' are positioned loosely in the receiving notches 137 in the ring 134 and thus the sleeve 133 is free to move transversely as the shaft whips. The degree of displacement allowed is set by the radial dimension of the annulus between the floating sleeve and the housing. During such displacement, the integrity of the seal between the gland and the wear sleeve and shaft is not impaired.

We claim:

1. A sealed shaft assembly comprising a rotatable shaft member, a housing member for said shaft, a floating sleeve mounted on said housing for radial displacement relative to said housing, means providing a flexible connection between said housing and said sleeve including a sealing boot spaced from said housing member, said sleeve being otherwise unsupported by either of said members to enable said radial displacement, a packing gland including packing elements and opposed walls engaging said packing elements, one of said walls being said shaft member and the other of said walls being said sleeve, and means on said sleeve and on said housing holding said sleeve and said gland against rotation relative to said housing.

2. The assembly of claim 1 in which said boot is at the upper end of said sleeve, said boot enclosing the space between said sleeve and one of said members.

3. The assembly of claim 1 in which said boot is at the lower end of said sleeve, said boot enclosing the space between said sleeve and one of said members.

4. A sealed shaft assembly comprising a shaft, a housing for said shaft, a first sleeve mounted on said housing, a flexible boot at one end of said sleeve connected to said housing and said first sleeve and forming an enclosed space between said sleeve and said housing, a wear sleeve on said shaft, a gland between said first sleeve and said wear sleeve in sealing contact with said wear sleeve, said wear sleeve extending above and below said gland, means on said shaft and wear sleeve for rotation of said wear sleeve with said shaft, and means on said housing and said first sleeve holding said first sleeve against rotation while allowing radial movement of said shaft and said first sleeve.

5. A sealed bearing assembly for a rotating shaft subject to cyclic forces acting transversely to the axis of said shaft comprising a housing, a fluid inlet to said housing, a bearing between said shaft and said housing, a wear sleeve and seal assembly between said fluid inlet and said first-named bearing, said seal assembly including a floating sleeve, a flexible boot connected to one end of said floating sleeve and to said housing, and a packing gland on said floating sleeve in sealing contact with said shaft, and means on said housing and said sleeve holding said sleeve against rotation while allowing radial movement of said shaft and said sleeve.

6. A progressing cavity fluid motor which includes a rotor, a stator, and a stator housing, a tubular shaft connected to said rotor, a housing for said shaft, a fluid inlet into said stator and a fluid outlet from said stator, a fluid passageway from said stator outlet and into said tubular shaft, radial and thrust bearings mounted in said shaft housing, the improvement which comprises a sleeve, means to mount said sleeve at one end thereof on said shaft housing, said means including a flexible boot connecting one end of the said sleeve to said shaft housing and forming an enclosed space between said sleeve and said shaft housing, a packing gland, means to mount said gland between said sleeve and said shaft, said packing gland being in sealing contact with said shaft, said gland having opposed walls, one of said walls being said shaft and the other of said walls being said sleeve and said means to mount said sleeve on said shaft housing holding said sleeve and said gland against rotation relative to said shaft and said housing.

7. In the assembly of claim 6, a bearing mounted in said shaft housing between said shaft and said shaft housing, a fluid inlet to said housing, said gland and sleeve position in said shaft housing between said inlet and said bearing.

* * * * *